March 5, 1968     A. A. HURSCHMAN     3,372,081
APPARATUS FOR PRODUCING FUSED THERMOPLASTIC SEALS
Filed July 21, 1964     3 Sheets-Sheet 1
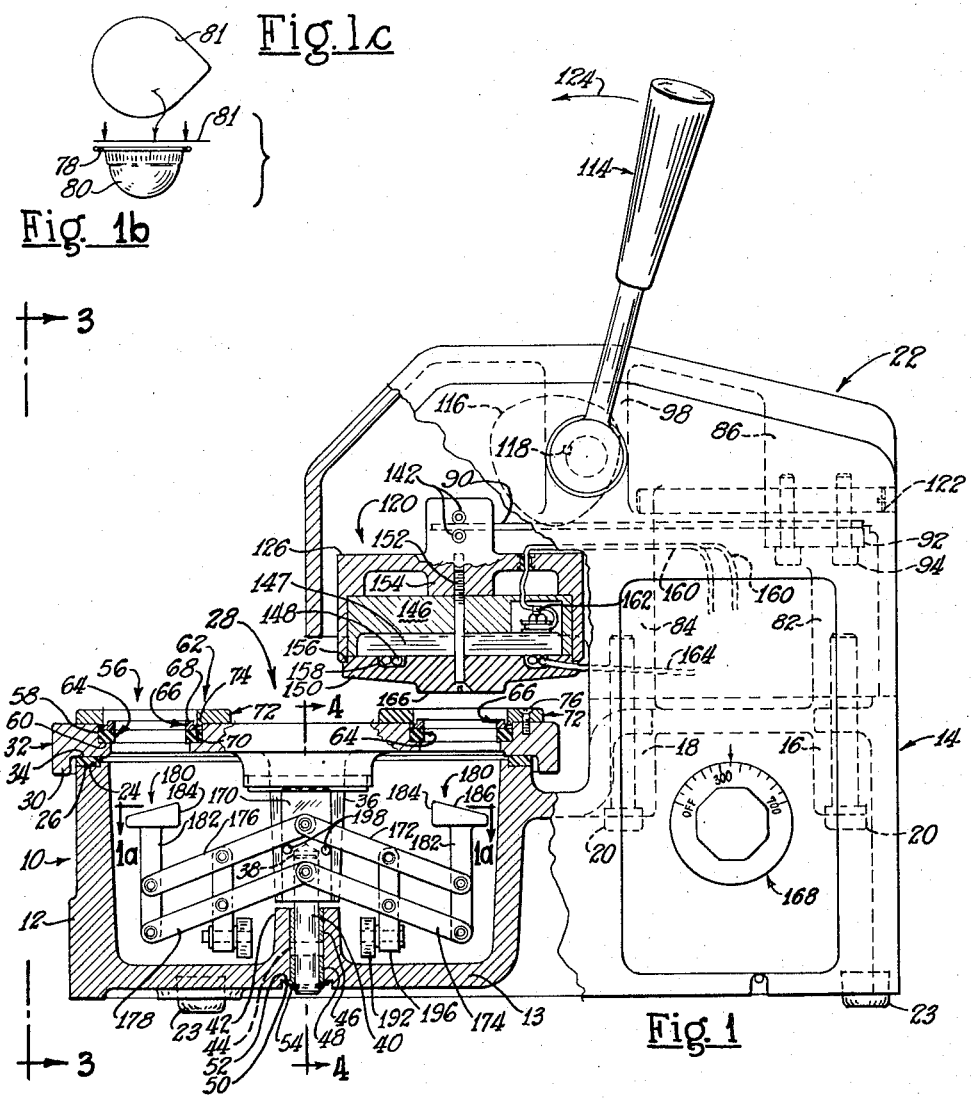
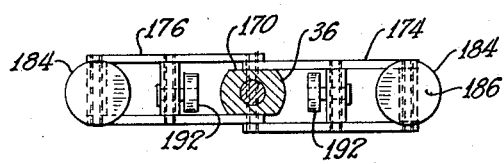
INVENTOR.
ALFRED A. HURSCHMAN
BY
ELY, PEARNE & GORDON
ATTORNEYS March 5, 1968   A. A. HURSCHMAN   3,372,081
APPARATUS FOR PRODUCING FUSED THERMOPLASTIC SEALS
Filed July 21, 1964   3 Sheets-Sheet 2
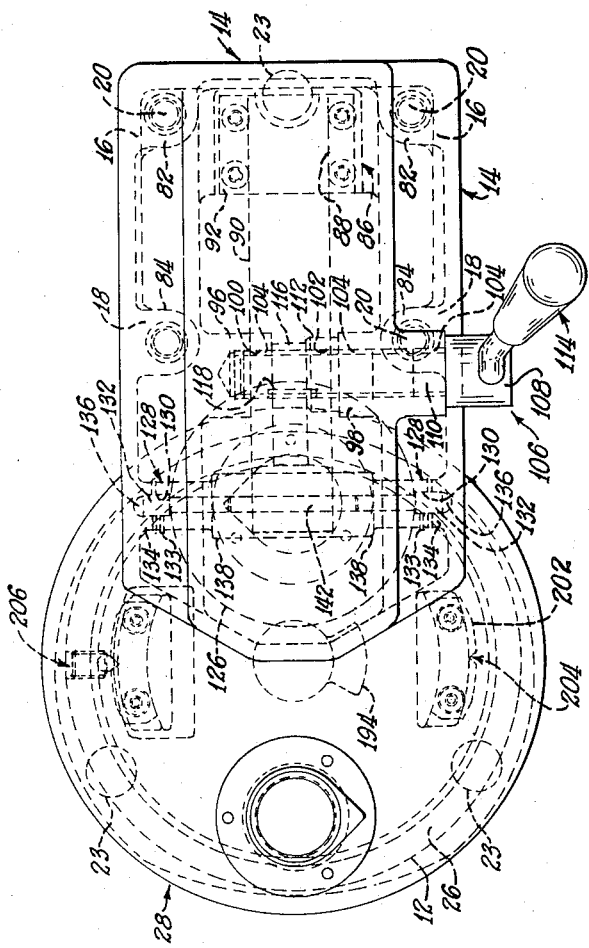
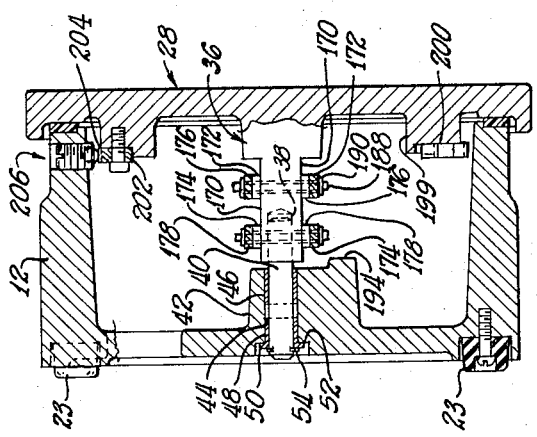
INVENTOR.
ALFRED A. HURSCHMAN
BY
ELY, PEARNE & GORDON
ATTORNEYS

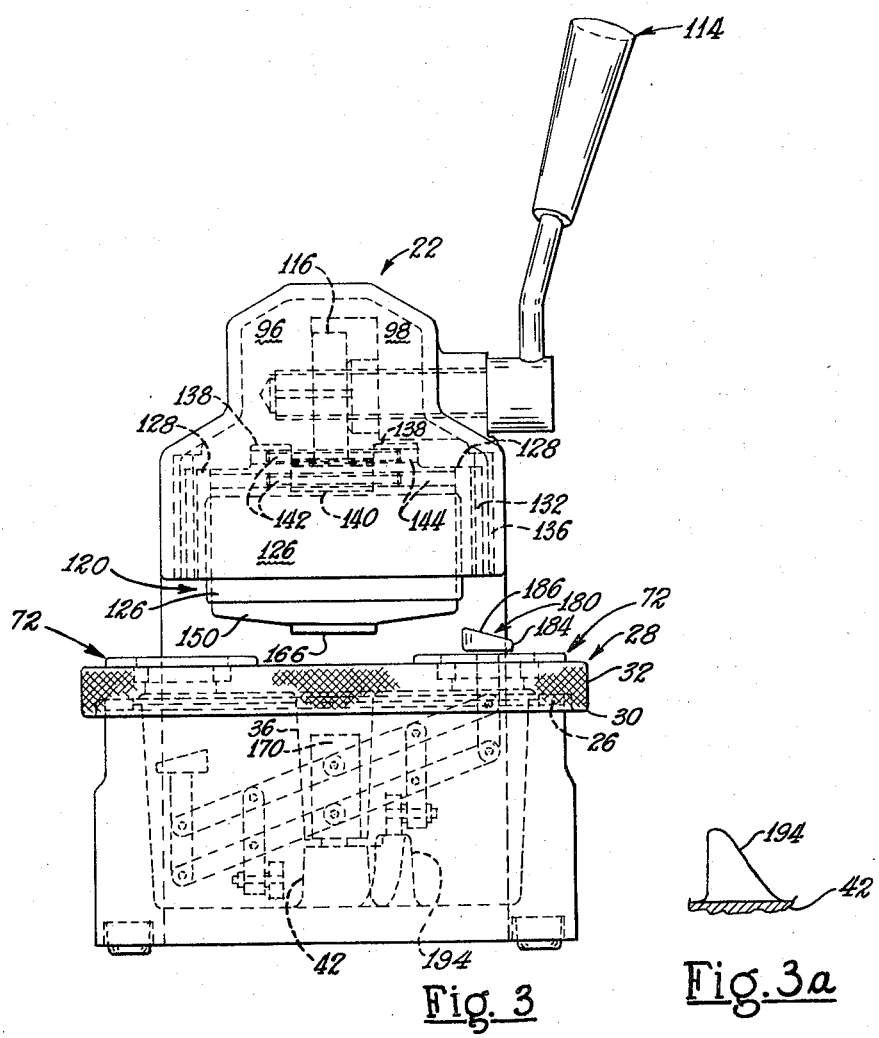

United States Patent Office 3,372,081
Patented Mar. 5, 1968

3,372,081
APPARATUS FOR PRODUCING FUSED
THERMOPLASTIC SEALS
Alfred A. Hurschman, Hudson, Ohio, assignor to
Ampoules, Inc., Hudson, Ohio, a corporation of
Ohio
Continuation-in-part of abandoned application Ser. No.
357,985, Apr. 7, 1964. This application July 21, 1964,
Ser. No. 384,228
10 Claims. (Cl. 156—583)

ABSTRACT OF THE DISCLOSURE

A press for heat sealing plate-like thermoplastic resin comprising a pair of opposed relatively movable pressure-applying dies and an actuator linkage for moving the dies together. One of the dies has a soft elastomeric base upon which a relatively rigid contact member having a smooth planar face is mounted.

This application is in part a continuing application with respect to Serial No. 357,985, filed April 7, 1964, now abandoned.

This invention relates to the art of sealing closures to containers such as cups; more particularly, this invention relates to a machine and method for sealing a cap coated with a thermoplastic resin to a metallic cup or container.

*The problem*

Speed of operation is the essence of any commercially feasible machine or method for closing containers. For high speed production with economies of labor, machine amortization, and other cost factors, a capping cycle must be very short else the fixed cost factors prevent the process from being competitive.

As regards the production of a thermoplastic seal between a cap and a container, the challenge of high speed is truly a great one, when it is realized that at least 60 seals a minute are necessary to establish a competitive position. Actually 60 cycles per minute of complete seals amount to a total of 120 cycles, as follows:

(a) 60 cycles per minute of heating up the die and softening the thermoplastic coating or sealing material; and (b) 60 cycles per minute of cooling the heated and fused thermoplastic material after the encapsulation has been made, to stabilize the seal.

A further problem is to produce a machine and method for operating at such speeds that is of relatively low cost, and trouble-free over many millions of cycles. This means that such activating devices as hydraulic cylinders and the like which fail at approximately 500,000 cycles cannot be used. It further means that mechanical linkages of ingenious design are required in order to eliminate more expensive and complicated cylinders and the like, mentioned above.

In the prior art, the problem has further manifested itself at 60 cycles per second in the fact that the sealing temperature has to be so high in order to get in instantaneous fusion of the thermoplastic material, that scorching and poor sealing result.

A further problem has arisen in the prior art because of the high sealing pressures previously found necessary. The need for such pressures has been caused, at least in part, by the inevitable departures of the cup flanges from a truly flat annulus. Forces of the order of 300–500 pounds on the sealing head have generally been used to effect what amounted to a final rim-forming action which would force the rim to a true plane and given uniform contact with the cover plate all around the entire periphery.

In the past, the high pressures required have often extruded the plastic coating material from between the cup flange and the cover plate in some areas. This sometimes resulted in a metal-to-metal seal in these areas, while the remaining areas were plastic-to-plastic seals. This has caused difficulty in stripping the cover from a cup.

In view of the foregoing, a substantial advance to the art would be provide by apparatus and method for producing thermoplastic seals having the following characteristics:

(a) High speed,
(b) Perfect seals,
(c) Low sealing pressures,
(d) Tolerance for irregularities between cap and cup flange; and
(e) Lower sealing temperatures.

Accordingly it is an important object of the present invention to provide a novel machine and method for effecting thermoplastic seals as between flanged cups and caps therefor.

A further object is to provide a novel machine for effecting thermoplastic seals at high speed, but at lower pressures and lower temperatures than the prior art.

A further object is to provide a method for producing thermoplastic seals at high speed and with perfect plastic-to-plastic sealing entirely around the zone of contact between a flange metal cup and a cover or cap therefor.

Other objects of this invention will appear in the following description and appended claims, reference being had to the accompanying drawings forming a part of this specification wherein like reference characters designate corresponding parts in the several views.

FIGURE 1 is a side elevational view, partly broken away in section, of one form of sealing machine embodying the present invention;

FIGURE 1a is a sectional view, taken along line 1a—1a of FIGURE 1;

FIGURE 1b illustrates a cup and cap that are to be sealed together by the machine of FIGURE 1;

FIGURE 1c is a plan view of the cap of FIGURE 1b;

FIGURE 2 is a top plan view of FIGURE 1;

FIGURE 3 is a front elevational view, taken along line 3—3 of FIGURE 1;

FIGURE 3a is an enlarged, fragmentary view of a ramp forming part of the ejector mechanism; and FIGURE 4 is a transverse sectional view, taken along line 4—4 of FIGURE 1.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Introduction to the invention*

In the present invention, a plastic-to-plastic seal between thermoplastic coatings on sealing surfaces of a cup or container 80 (FIGURE 1b) and a cap or closure 81 therefor (FIGURE 1c) is effected at lower pressures and lower temperatures than heretofore possible. This is achieved by a machine combination wherein simple mechanical linkages are used, for low cost and long life, and quick action without inertia delays. Further, the machine incorporates a novel die seat for the cup flange and a novel, heated, plunger head for pressing the periphery of the cap into conforming contact with a flange 78 of the cup, whereby perfect seals are produced with much lower pressures and at much higher speeds than in the prior art.

As part of the environmental background in which the present invention is utilized, it should be stated that the thermoplastic coating on the underneath side of the cap 81 and the inside of the cup 80 is preferably polyvinyl chloride. A polyethylene coating on both the cap 81 and cup 80 also can be used. When producing a thermoplastic seal between polyvinyl chloride coatings on the cap 81 and the flange 78, sealing temperatures in the range of 470° to 550° F. at the die surface are herein contemplated.

Although the cap 81 of the cup can be pure aluminum foil of a sufficiently heavy grade, economic factors dictate that this be a paper backed laminate. Thus a very thin foil of one mil or less can be utilized when backed up by a reinforcement paper web. Since the seal is made on the metal side with the paper uppermost, the metal side of the cap is thus coated with the thermoplastic bonding material. Additionally, the upper side of the flange 78 (as well as the entire inside of the cup 80) is provided with a thin coating of this thermoplastic material to provide a thermoplastic seal. Thus the seal is formed by fusion of the engaged plastic coatings on the closure or lid and on the rim of the cup.

The invention

Reference numeral 10 designates a relatively complex frame that forms the skeleton of the machine and is suitably made as a casting. At the front of the frame, as best shown in FIGURE 1, there is a vertical, annular wall 12 around a bottom wall 13. As shown in FIGURES 1 and 2, the wall 12 blends with a box-like structure at the back, designated 14. The whole unit sits on feet 23.

As best shown in FIGURE 1, the structure 14 incorporates, at each of its back corners, an enlarged boss 16. At the front portion and at the corners of the box-like structure 14, bosses 18 are provided. As shown in FIGURE 2, the bosses 16 and 18 are bored to receive bolts 20 by which a head casting 22, to be later described, is held in place.

The rotatable table and the sealing seats and ejector mechanism

At its top edge, the annular wall 12 is provided with an L-shaped groove 24 into which is fitted a nylon bearing ring 26 for a rotary table 28 of circular configuration, as shown in FIGURE 2. Around the periphery of the table 28, there is formed a downturned lip 30 having a knurled periphery 32 which is useful for hand adjustments as necessary during the setting up of the machine and for manually indexing the table 28.

The underneath side of the table 28 is provided with an annular bearing surface 34. This rests on top of the antifriction, nylon bearing ring 26 to permit the table 28 to be rotated easily by an operator grasping the knurled table periphery 32. It should be stated that the downturned lip 30 protects the operator's fingers from possibly being pinched between the annular bearing surface 34 and the nylon bearing ring 26.

From FIGURES 2 and 3, it will be noted that the top surface of the table 28 is generally flat. Its bottom side is provided with a downwardly extending, inverted, frusto-conical boss 36. As shown in FIGURES 2 and 4, this boss 36 is provided with a downwardly opening, coaxial bore 38. Into this bore is press-fitted the upper end of a short stub shaft 40. The bottom wall 13 of the frame is provided with an upwardly extending central boss 42. This boss is provided with a bore 44 in which are fitted upper and lower sleeve bushings 46 and 48. These rotatably receive the bottom end of the stub shaft 40. At its lower end, the bushing 48 is provided with an annular shoulder 50 that abuts a shoulder 52 of the bore 44, and the lower end of the stub shaft 40 is grooved and fitted with a snap ring 54, that abuts the under surface of shoulder 50 of bushing 48 to prevent undesired lifting of the table 28 from its seat.

Thus, the table is supported for rotation on the nylon bearing ring 26, and the stub shaft 40, in addition to serving as a vertical retainer, restrains the table 28 to rotate about a fixed axis.

The die seat assemblies

In this particular embodiment of the invention there are two die sealing stations on the rotatable table 28. Thus, diametrically opposed holes 56 are bored through table 28 and counterbored at 58 to provide shoulders 60 on which a pair of die seat assemblies 62 are supported. Thees holes 56 are positioned between the inner periphery of the frame wall 12 and the central boss 36 so that, when a cup is fitted in a die seat therein, it can extend below the bottom surface of the table 28 without interference. Further, ejecting arms 180 are free to operate up through the holes 56, as described below.

The die seat assemblies 62 form an important component of the present invention and, by the combination of materials utilized therein, contribute greatly to the rapid production of perfect seals. Thus, perfect seals are produced with lower sealing pressures; and the components have a built-in tolerance for irregularities in the flange of the cup or container should it be out of a truly flat, planar configuration.

The bottom component of each die seat assembly 62 comprises a ring 64 of soft neoprene rubber or foamed plastic, such as foamed polyurethene, or the like. This provides resilience for the assembled component 62 to accommodate irregularities in the flange or lip of the container and cradle it accurately relative to a die plunger to be described hereinafter. In the drawing, the ring 64 is shown as an annulus of rectangular section. Within the scope of the invention, this ring also may be of circular section, like an O ring.

The upper portion or component of the die seat assembly 62 comprises a relatively thin die ring 66 of harder material. This has a generally L-shaped section providing an annular seat portion 68 about the inner periphery of the ring and a lower stepped portion 70 of greater diameter.

One suitable material for the die ring 66 is Teflon, a trademark of the Du Pont Company for a plastic consisting of tetrafluoroethylene polymer. This material has good heat stability as evidenced by the fact that it can be successfully employed over a temperature range of $-75$ to $+250°$ C. Another material that also can be used is synthetic silicone rubber, the molecules of which are long chains of silicon-oxygen units with 2 methyl groups attached to each silicon atom. This latter material retains its elasticity at temperatures as high as 300° C. One particular and suitable silicone rubber is sold under the trademark Silastic by the Dow Corning Corporation.

Silicon rubber is available in over forty fully compounded stocks and pastes for fabricating by molding, etc. The material may be formed either as a dense rubber or as a sponged material. Therefore, within the scope of invention, both the ring member 66 and the spongy member 64, FIGURE 1, may be made of appropriate formulations of this material that are advantageously used because of their heat-resisting properties. The material is actually useful over a wider temperature range than any other known rubber-like material.

An annular retainer member 72, having an inside lip 74 to slidably fit within the counterbore 58, is suitably held in place, as by screws 76 (see right side of table 28 in FIGURE 1). With the bottom surface of the retainer ring 72 tightened against the top surface of the table 28, its lip 74 engages the stepped portion 70 of the die ring 66 to hold it in place. Thus, it is not necessary that the die ring 66 be cemented on top of the softer, neoprene rubber cushion 64. However, this may be done if desired.

Note that in case of irregularities of the flange 78 of a cup 80 (FIGURE 1b), the die ring 66 may float on the cushion 64 so as to conform exactly to the flange while providing a firm supporting surface for the cup flange.

*Support and actuator for the heat sealing ram or head*

The head casting 22, previously referred to, is an inverted box-like structure with its bottom open. At the back, as shown in FIGURE 1, bolting bosses 82 and 84 are provided in mating relationship above the bolting bosses 16 and 18, respectively, for engagement by bolts 20. At the back, the head casting 22 also includes a central support boss 86 for a flat actuating spring 90 that supports and moves a heat sealing head 120 described below. On its underneath side, the boss 86 is grooved at 88 to receive the rear end of the leaf spring 90.

A retainer plate 92 of generally rectangular configuration underlies the rear end of the spring 90 and is fastened to the boss 86 by four bolts 94 that are passed through holes in the plate 92 and into threaded apertures in the boss 86.

Centrally of the head casting 22 and extending downwardly from the top are opposed handle support bosses 96 and 98. These are provided with coaxial bores 100 and 102 (FIGURE 2). In the bore 100 is placed a bushing 104, and in the bore 102 are three spaced bushings 104. An actuating handle assembly 106 includes an end boss 108 and a shaft 110. The shaft 110 is fitted into the three bushings 104. The end boss 108 abuts the outside of the handle support boss 98. At the inside of the boss 98 is a collar 112 fastened by suitable means, such as a set screw, to hold the shaft 110 in axial position.

The actuating handle 114 extends radially outwardly from the end boss 108.

Between the inside of the collar 112 and the inside of the handle support boss 96, a cam 116 is fitted on the shaft 110. The shaft 110 and cam 116 are provided with slots to receive a square-sectioned key 118, whereby the shaft and cam are locked to one another.

As best shown in FIGURE 1, when the handle 114 is moved in the counterclockwise direction 124, the cam 116 will be effective to press the outer end of the leaf spring 90 vertically downwardly, and this action is effective to move the sealing head 120 downwardly for the welding or sealing cycle.

As shown in FIGURE 1, a screw 122 is run through a threaded bore in the actuating spring support boss 86 in alignment to be engaged by the cam 116. By setting this screw to a proper axial position, the bottom position of the lobe of the cam 116 can be established, and thus the amuont of downward bias imposed on the outer end of the leaf spring 90 can be set to a desired level to provide a proper heat seal. The resiliency of the spring 90 will be effective to raise the sealing head 120 and return the handle 114 to a rest position. As a general rule, the over center position of the handle, indicated in FIGURE 1, and the weight of the handle will be effective to cause it to drop back a little bit beyond the position in FIGURE 1 so that the cam 116 will abut the top of the housing 22 for a rest or static position of the handle.

*Details of the sealing head*

The sealing head 120 comprises a generally cylindrical, inverted, cup-shaped housing 126 having diametrically opposed bosses 128 (FIGURE 2). These bosses 128 are each provided with longitudinally extending, square-sectioned slide grooves 130 that each receive a slide bar 132 of rectangular section. The head casting 22 is provided with opposed bosses 134 that are each provided with a U-shaped groove 136. The grooves 136 slidably receive the slide bars 132, which are held in place by means of set screws 133 and provide guided vertical movement for the head 120. The parts are not tightly fitted, however, and substantial clearance between the slide bars and walls of the slide grooves is preferred. This permits the head to more readily conform to the parts being sealed, by tilting slightly in any direction as may be required for this purpose. Such tilting is permitted by the resilient flexibility of the leaf spring 90 from which the head 120 is supported.

As will be observed in FIGURE 1, the sealing head 120 is operatively attached to the free end of the leaf spring 90. This attachment is effected through opposed bosses 138 (FIGURES 2 and 3) that extend above the top surface of the cup-shaped housing 126. A slot 140 is milled into the top of the housing 126 between the bosses 138, and parallel pins 142 are pressed into holes 144. The pins 142 are spaced apart vertically a sufficient distance to accommodate the thickness of the free end of the spring 90 (FIGURE 1).

It can therefore be seen that actuation of the handle 114 to move the cam 116 and thereby bias the free end of the spring 90 downwardly will be effective to move the sealing head 120 downwardly, and that the bias of the spring is effective automatically to return the head upwardly when pressure is relieved from the handle 114.

Inside of the cup-shaped housing 126 is positioned a circular, insulating refractory block 146 having a recessed lower face receiving a resistance heater 147. The bottom side of the cup-shaped housing 126 is closed by a bottom plate 150, held in place by a bolt 152 that extends through a hole in the center of the plate, through the resistance heater 147 and refractory block 146, and up into a threaded hole formed in a central, internal boss 154 in the top of the housing 126. A groove 156 around the periphery of the plate 150 provides a locating seat receiving the bottom edge of the housing 126 for coaxial alignment of plate 150 and housing 126. The top side of the bottom plate 150 is provided with a groove 158 of annular configuration and sufficient width to receive a thermostatic, gas filled, tube 164 that runs from a heat control box 168 (described below) into and twice around the groove 158. This thermostatic tube is so disposed and sufficiently flexible to permit the small amplitude of movement of the head 120.

Current is fed to the heater 148 by a pair of incoming leads 160 that pass through a grommeted opening in the top of the housing 126 and connect to a pair of terminals 162 (only one being shown). Both leads 160 run to the heat control box 168 that is fastened to the side of the rear, box-like wall 14 of the frame 10 and contains a conventional, thermostatically regulated and manually adjustable, heat control unit (not shown) for supplying current to the heater 147 and maintaining it within a set temperature range.

The bottom portion of the bottom plate 150 of the sealing head 120 is of reduced diameter so as to provide a boss 166 forming a focal point for the heat produced by the heater 147, as such heat travels through the bottom plate 150.

The periphery of the downwardly projecting boss 166 is aligned with the outer periphery of the ring 66 (FIGURE 1). As built into the machine, the bottom surface of the boss 166 and the upper surface of the die ring 66 are substantially parallel to one another to respectively engage and provide intimate contact with a cap 81 and cup flange 78 entirely around their peripheries upon actuation of the handle 114. It is to be noted that the cushion-like support ring 64 beneath the ring 66 allows the ring 66 to conform in a general way to a non-planar bottom surface of the rim or flange 78 of the cup 80, while the slight tiltability of the head 120 allows the rigid bottom surface of the boss 166 to conform precisely to the plane of the lid 81 without distortion of the lid. This contributes to a perfect seal between the rim 78 of cup 80 and the cap 81 by keeping the lid in a plane while firmly conforming the cup ring thereto with a substantially uniform pressure.

The relatively stiff ring 66 has an actual thickness of only about ⅛ inch. Thus it is sufficiently flexible to distort from a true plane at its upper surface and conform to minor irregularities in the bottom surface of the cup rim which it engages and supports. The softer, lower cushion 64 facilitates such deformation as the relatively low pressures applied by the sealing head in accordance with the objectives of the invention. This provides a perfect cradling or support of the under surface of the cup flange 78 around its entire periphery. Thus, when the boss 166 is brought down onto a cap 81, the cap and cup flange, even if not initially perfectly planar, are nevertheless urged together in intimate planar contact. When the heat is applied, this causes a perfect fusion to be effected between the thermoplastic material carried on the upper surface of the cup flange 78 and the bottom side of the cap 81 about the entire periphery of both.

By reason of the construction of the seat assembly 62, sealing head 120, and mounting of the sealing head described above, it is now possible for the first time consistently to produce uniformly perfect hermetic seals with the application of only a momentary and relatively low pressure to the parts to be sealed. The force by which this pressure is produced need only be from about 40 to 60 pounds, as applied to the sealing head through the handle 114, compared to a force of about 300 to 500 pounds required to be applied to the movable head in prior sealing machines for performing the same sealing operation. Since the cam multiplies the pressure on the handle 114 by a factor of about 4, it will be understood that very little effort is required on the part of an operator to effect the seal using the present invention. Handle pressures of 15 pounds are therefore adequate.

The machine here under consideration is a manually operated device with a two station turntable 28. However, it will be appreciated that the principles involved in that device can readily be applied to a mechanized unit capable of operating on a much faster cycle than possible by manual actuation. Test data developed on this machine have verified this fact.

*The sealing operation*

In FIGURE 1b, there is shown a cup 80 and lid 81 which are positioned with the cup flange 78 resting upon the die ring 66. The operator then indexes the table 180° by grasping the knurled rim 32, thus moving the cup and lid beneath the sealing head 120. The sealing head 120 is maintained at sealing temperature by the setting of the control mechanism in the box 168. The handle 114 is then grasped and brought forward in the arrow direction 124, so that instant pressure contact is provided between the boss 168 and cap 81, thus applying heat to the cap and effecting the seal. While the operator has been reaching forward to grasp the handle 114 with his right hand, he has been using his left hand to position another cup and cap assembly at the front loading station 56.

*The ejector mechanism*

As the operator then rotates the turntable to bring the new cup and cap assembly into sealing position and bring the sealed article out from under the head 120, the ejector mechanism comes into play. This is shown best in FIGURES 1a, 2, 3, and 4. On opposite sides of the inverted, frusto-conical boss 36 and extending downwardly from the bottom of table 28, are opposed flats 170. Parallel pairs of upper and lower arms are fitted at each side to these flats in upper and lower pairs and pivotally connected to form parallelogram linkages. As shown in FIGURES 1 and 4 a pair of upper arms 172 and a pair of lower arms 174 are mounted on one side of the frusto-conical boss 36, and a pair of upper arms 176 and lower arms 178 are mounted on the left side of the boss 36.

At the ends of the arm sets 172 and 174 is pivotally mounted an upstanding ejector plunger 180, and similarly, at the ends of the arms 176 and 178 is an ejector plunger 180. Each ejector plunger comprises a rod-like body 182 and a head 184. The pivotal connections between the arms 172 and 174 and the rod-like body 182 are spaced apart a distance equal to the spacings between the pivotal connections of the inner ends of arms 172 and 174 to the flats 170 on boss 36. Thus, a parallelogram linkage is established by the four elements 36, 182, 172, and 174. The arms 176 and 178 are similarly interconnected by the boss 36 and the other ejector plunger 180.

The head 184 of each ejector plunger 180 has an inclined upper surface 186, whereby a cup is not only lifted out cocked over and rolled radially away from the center of the machine so as to be ejected or dropped into an appropriate container for the sealed units, such as a tote box, basket, or the like.

The pivotal connections for the arms 172, 174, etc., are shown in detail in FIGURE 4. These include pins 188 that pass through the ends of the arms and the boss 36 with snap rings 190 being used to retain the parts in assembled relationship.

The mechanism by which the ejector plungers 180 are lifted to produce their function, includes roller members 192 that ride up a ramp 194 (FIGURES 2, 3 and 3a). The rollers 192 are mounted at the bottom ends of intermediate arm members 196 (FIGURE 1) that are of generally bar-like configuration and rectangular section to fit between the arms 172, 174, 176, and 178 with pivotal connections thereto. The ramp or cam surface 194 is shaped as shown in FIGURE 3a and is cast with the boss 42 so as to be in alignment with the rollers 192 during rotation of table 28.

As the table is rotated 90° from the position of FIGURE 1, the roller 192 will ride up the ramp 194 and, at the 90° position (270° from start at the loading station), will cause the ejector head 184 to be moved up to the position of FIGURE 3.

The inclined upper surface 186 of the head 184 will cause an ejected cup to fall to the right in FIGURE 3 to an appropriate receptacle (not shown).

During the next 90° movement of the table, roller 192 will drop off the top of the cam surface 194, and the ejector 180 will drop to the position shown at the left side of FIGURE 1. Limit pins 198 (FIGURE 1) establish the bottom position of the ejectors 180.

*The indexing mechanism for the table*

The table actually has two index positions which are 180° apart. The mechanism for effecting the indexing is shown in FIGURES 2 and 4.

As shown in FIGURE 4, bosses 199 project downwardly from the underneath side of the table 28. To the bottom side of each boss, in an appropriate notch 200, is bolted a detent plate 202 having a detent notch 204 (FIGURES 2 and 4) centrally on the outer periphery thereof.

A ball detent member 206 is set into the upper portion of the frame wall 12 in engageable alignment with the detent notches 204. Each ball detent member 206 comprises a threaded screw with a drilled cavity therein having a ball backed up by a spring. The ball is retained in place by peening over the metal at the ball end of the screw after the ball is inserted.

*Improved results*

Utilizing the seat and sealing head assemblies of the present invention, hermetic seals are consistently obtained in as short a time as 0.2 second of pressure application from the sealing head. This leaves 0.8 second for the loading and indexing of a machine operated at 60 cycles per minute, which is sufficient even for hand loading and indexing of the simple machine herein disclosed. It is more than sufficient for machines of a more elaborate design equipped for automatic feeding and indexing.

In prior machines of the same general character but utilizing other seat and sealing head assemblies, sealing pressures were required to be maintained for about two seconds in order to obtain an effective seal, and satisfactory seals were never consistently obtained. In some instances, the high sealing pressures heretofore mentioned, together with the applied heat, caused the plastic material to be extruded from between areas of the engaged parts and caused metal-to-metal seals to form. This causes difficulty in stripping the covers from the cups. In other instances, with the same pressures and sealing times, uniform sealing entirely around the periphery of the cups was not obtained, and no seal at all occurred at some points. Thus, with operating cycles well in excess of two seconds, the results heretofore obtained have been highly erratic. By contrast, the seals produced by the machine of the present invention, with sealing pressures being maintained for only 0.2 second, have consistently produced reliable hermetic seals entirely about the pehiphery of cups with complete avoidance of the objectionable metal-to-metal seals frequently resulting with the prior machines. Thus, the present invention has not only reduced the time required for the actual sealing step to 1/10 of what was previously required, but also, for the first time, it has consistently produced reliable, hermetic, plastic seals only rarely and inconsistently obtained heretofore.

What I claim is:

1. In apparatus for producing fused seals,
a frame,
a die supporting table carried by said frame,
a die cavity in said table including an annular seat,
an elastomeric annular cushion positioned on said annular seat,
a heat-resisting sealing ring member positioned on said cushion in exposed condition,
means retaining said cushion and ring on said seat,
a heat-sealing head carried by said frame for movement into heat-sealing contact with said sealing ring,
means for moving said sealing head,
a sealing plunger contact member carried by said sealing head for engaging said sealing ring,
and means for heating said sealing plunger to heat-sealing temperatures.

2. In apparatus for producing fused seals,
an annular die member including a soft elastomeric base ring having a rigid, heat-resisting sealing ring thereon of synthetic resin,
said sealing ring being of a low order of thickness to permit it to deflect from a planar configuration upon being subjected to thermoplastic sealing forces,
means supporting said annular die member in space,
a ram member engageable with said annular die member,
means supporting said ram member in space,
means for moving said ram member into engagement with said annular die member,
and means for heating said ram member to heat-sealing temperatures.

3. In apparatus for producing fused seals,
a first die member including a soft elastomeric base component having a relatively rigid contact member thereon, and said contact member having a smooth planar contact face,
said contact member being formed of a synthetic resin of substantial rigidity, but being thin enough to exhibit measurable flexibility from a planar configuration,
said synthetic resin being resistant to heat-sealing temperatures and being of a low order of thickness to permit it to deflect from its normal planar configuration upon being subjected to sealing forces applied transversely to said contact face,
means supporting said first die member in space,
a second die member engageable with said first die member,
means supporting said second die member in space,
and means for moving said die members toward one another into sealing pressure relation.

4. In a die system for effecting fused seals between thermoplastic-faced members,
spaced die members of which one has engageable soft elastomeric material,
a relatively rigid plate-like contact member having a smooth, planar contact face interposed between said spaced die members and on the die member having said elastomeric material,
said contact member being formed of a heat-resistant synthetic resin of substantial rigidity, but of a low order of thickness to permit it to deflect from the normal configuration of said contact face,
means supporting said die members and said contact member in space,
and means for moving all of said members toward one another into a superposed, compressed relation.

5. The invention of claim 4, including means for heating said thermoplastic-faced members while said members are in said compressed relation.

6. In apparatus for producing fused seals,
a frame,
a rotatable table carried by said frame,
a die cavity in said table including a first die member of a configuration to receive to be sealed parts,
means for rotating said table,
a head member movably carried by said frame and supporting a sealing head in spaced relation to said table and in aligned relationship to said die cavity with said table indexed to bring said cavity opposite said head,
means for moving said head member toward and away from said die cavity,
a second die member carried by said head to engage the parts held in said die cavity and force said parts together between said die members,
and means in said head for heating said second die member to a temperature sufficient to fuse said parts together when said second die member is moved into compressing contact with said parts.

7. In apparatus for producing fued seals,
a frame,
a rotatable table carried by said frame,
a hole in said table defined by an annular die member to receive parts to be sealed,
means for rotating said table,
a head member carried by said frame and supporting a sealing head in spaced relationship to said table and in aligned relation to said table hole with said table indexed to bring said hole opposite said head,
a second die member carried by said head to engage parts held in said annular die member,
means for moving said head member toward said annular die member to force said parts together between said die members with sealing pressure,
means for heating said second die member to a level to fuse the parts together,
and means poistioned in spaced relation on the opposite side of said table and in alignment with said table hole to eject parts from said annular die member as it is moved away from said head on rotation of said table.

8. The invention defined in claim 7 wherein said ejector mechanism comprises:
spaced parallel arms pivotally mounted at one end to said table and movable therewith,
a head pivotally mounted to said arms at the other end for axial movement towards said table hole,
a roller carried by said arms,
a cam supported by said frame in engageable alignment with said roller, whereby engagement of said cam by said roller on rotation of said table is effective to move said ejector head towards said table hole and eject a part therefrom,
and means for moving said ejector head away from said hole upon traversing said cam.

9. In apparatus for producing fused seals,
a frame,
a rotaable table carried by said frame,
means for rotating said table,
a first die member carried by said table and of a configuration to receive to be sealed parts,
a leaf spring carried by said frame and being fastened at one end thereto with the free end extending over said table,
a sealing head operably connected to the free end of said spring,
guide means on said sealing head and frame to guide said head toward said first die member with said table indexed to bring said first die member opposite said head,
a second die member carried by said head to engage parts held in said first die member,
cam means carried by said frame and engageable with said spring means intermediate the ends thereof,
means for rotating said cam means to force said first and second die members toward one another with sufficient pressure to seal parts therebetween.
and means for heating said second die member to a level sufficiently high to fuse the parts together when said die members and parts are compressed together.
10. The invention defined in claim 9 including an ejector for expelling parts from said first die member, comprising:
- spaced parallel arms pivotally mounted to said rotatable table and movable therewith,
- a head pivotally mounted to said arms for axial movement towards said first die member and having a part movable through said first die member to contact parts supported thereon,
- cam follower means carried by said arms,
- a cam supported by said frame in engageable alignment with said follower, means, whereby enagagement of said cam by said follower is effective to move said ejector head toward said first die member and eject parts therefrom,
- and means for moving said ejector head away from said first die member upon traversing said cam.

References Cited
UNITED STATES PATENTS

| | | | |
|---|---|---|---|
| 2,574,094 | 11/1951 | Fener et al. | 156—583 |
| 2,574,095 | 11/1951 | Langer | 156—583 |
| 3,017,315 | 1/1962 | Doyle | 156—583 X |

EARL M. BERGERT, *Primary Examiner.*

HAROLD ANSHER, *Examiner.*